United States Patent [19]
Driskell

[11] Patent Number: 5,596,699
[45] Date of Patent: Jan. 21, 1997

[54] LINEAR-VIEWING/RADIAL-SELECTION GRAPHIC FOR MENU DISPLAY

[76] Inventor: Stanley W. Driskell, 4830 Washtenaw Ave., No. C2, Ann Arbor, Mich. 48108

[21] Appl. No.: 191,015

[22] Filed: Feb. 2, 1994

[51] Int. Cl.$^6$ ................................................ G06F 3/14
[52] U.S. Cl. ................................ 395/352; 345/146
[58] Field of Search ........................ 395/156, 155, 395/161; 345/145, 146, 902

[56] References Cited

U.S. PATENT DOCUMENTS 4,885,580  12/1989  Noto et al. ........................ 345/902 X

OTHER PUBLICATIONS

Hopkins, D., "Directional Selection is Easy as Pie Menus," Proceeding Fourth Computer Graphics Workshop, 8 Oct. 1987, Cambridge, MA, p. 103.
Callahan, J. et al., "An Empirical Comparison of Pie vs. Linear Menus," CHI '88 Conference Proceedings, Human Factors in Computing Systems, May 1988; Washington, D.C., pp. 95–100.
Mills, Z., et al., "Are All Menus the Same?—An Empirical Study," Human–Computer Interaction, Interact '90, Aug. 1990, Cambridge, U.K., pp. 423–427.
Kurtenbach, G., et al., "Issues in Combining Marking and Direct Manipulation Techniques," Proceedings on the Symposium on User Interface Software & Technology, Nov. 1991, South Carolina, pp. 137–144.
Hopkins, D., "The Design and Implementation of Pie Menus," Dr. Dobb's Journal, vol. 16, No. 12, Dec. 1991, pp. 16–26.
Rollo, C., "Pie Menus for Windows; Circular Menus Give a New Look to Old Windows," Dr. Dobb's Journal, vol. 17, No. 11, Nov. 1992, p. 30(8).
Rollo, Carl C., Internet Description of Pie Menus, "A Brief Description of Pie Menus for Windows," 1995.
Rollo, Carl C. Internet Description of Pie Menus, "Pie on the Menu in Your Program," 1992.
Hix, D., Hartson, Rex, "Menus" *Developing User Interfaces*, 1993, pp. 60–71.
Norman, Kent "Formatting and Phrasing the Menu," *The Psychology of Menu Selection*, 1991, pp. 126–258.
Diaper, D. et al. "Human–Computer Interaction" *Proceedings of the IFIP TC 13 Third International Conference on Human–Computer Interaction*, 1990, pp. 423–427.

*Primary Examiner*—Raymond J. Bayerl
*Assistant Examiner*—Crescelle N. dela Torre
*Attorney, Agent, or Firm*—Harness, Dickey & Pierce

[57] ABSTRACT

Elements of the value domain or option selections are displayed in two vertical, linear lists disposed in a menu structure having rectangular areas and nonrectangular areas. The nonrectangular areas have boundaries which radially diverge from an origin point at which the cursor is initially positioned. The origin point may be surrounded by a central zone which serves as a dead zone or optionally linked to a predefined option such as selection of a higher level menu. The resulting menu selection system results in a reduction in the physical effort expended to utilize the menu.

21 Claims, 13 Drawing Sheets

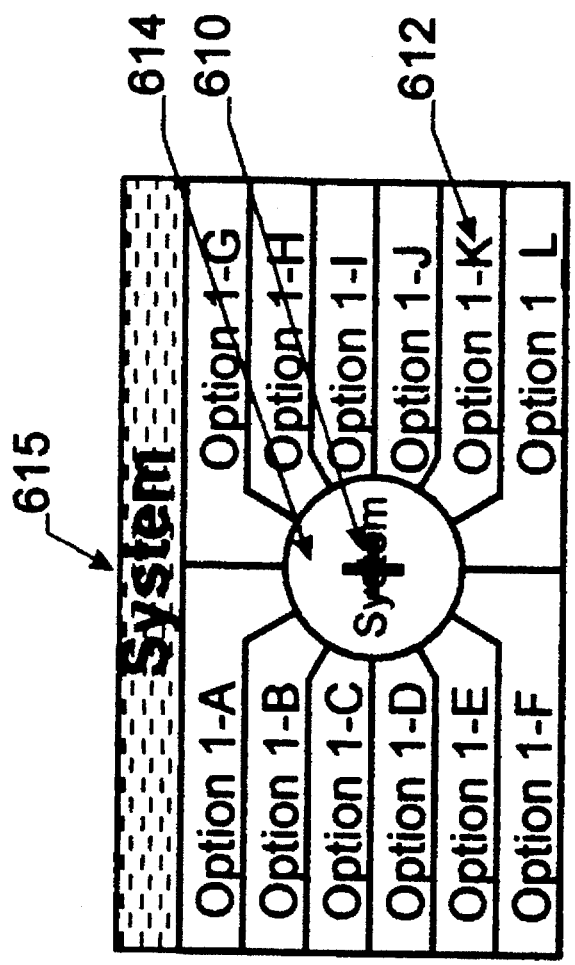
FIG 6-A

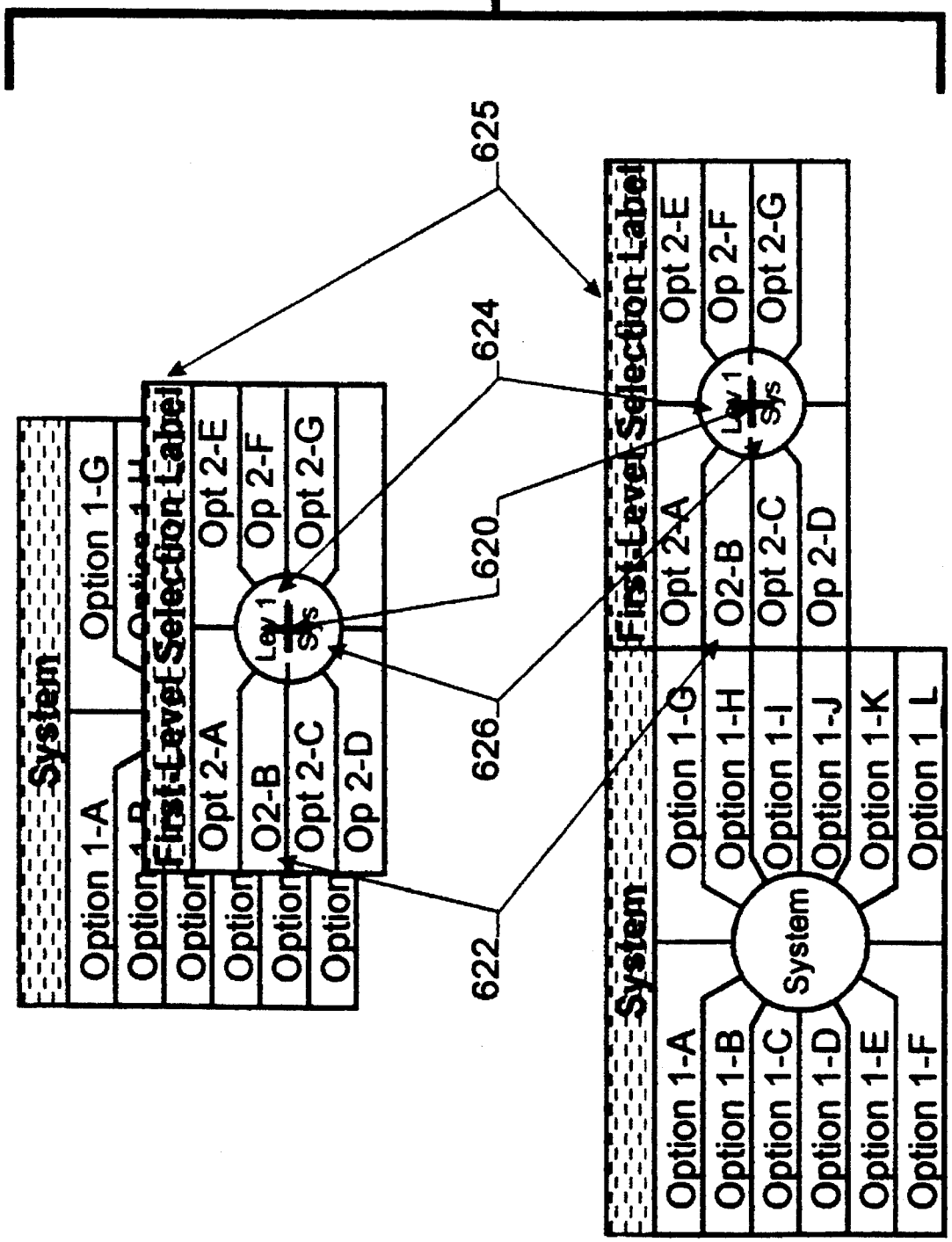

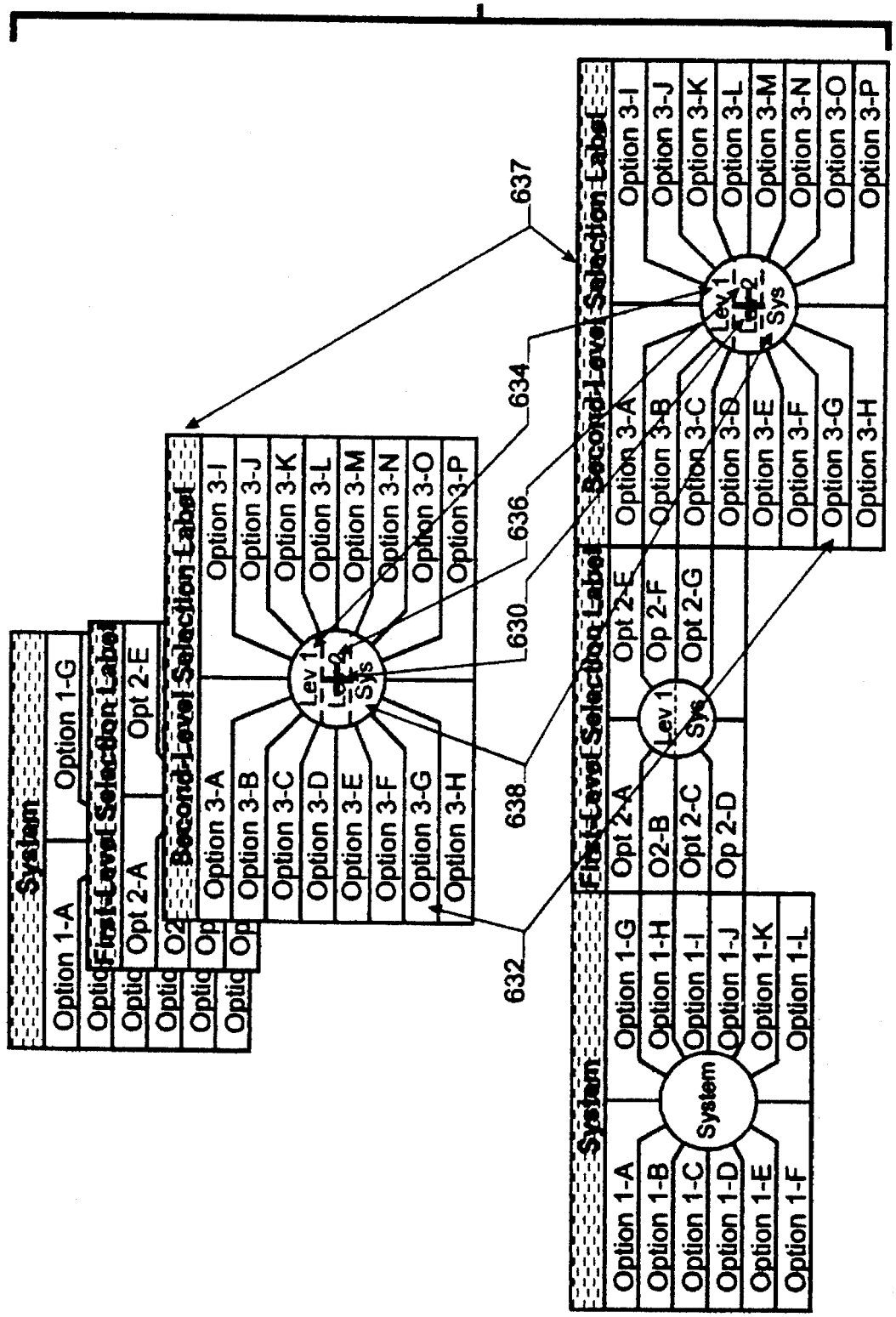
FIG 6-C

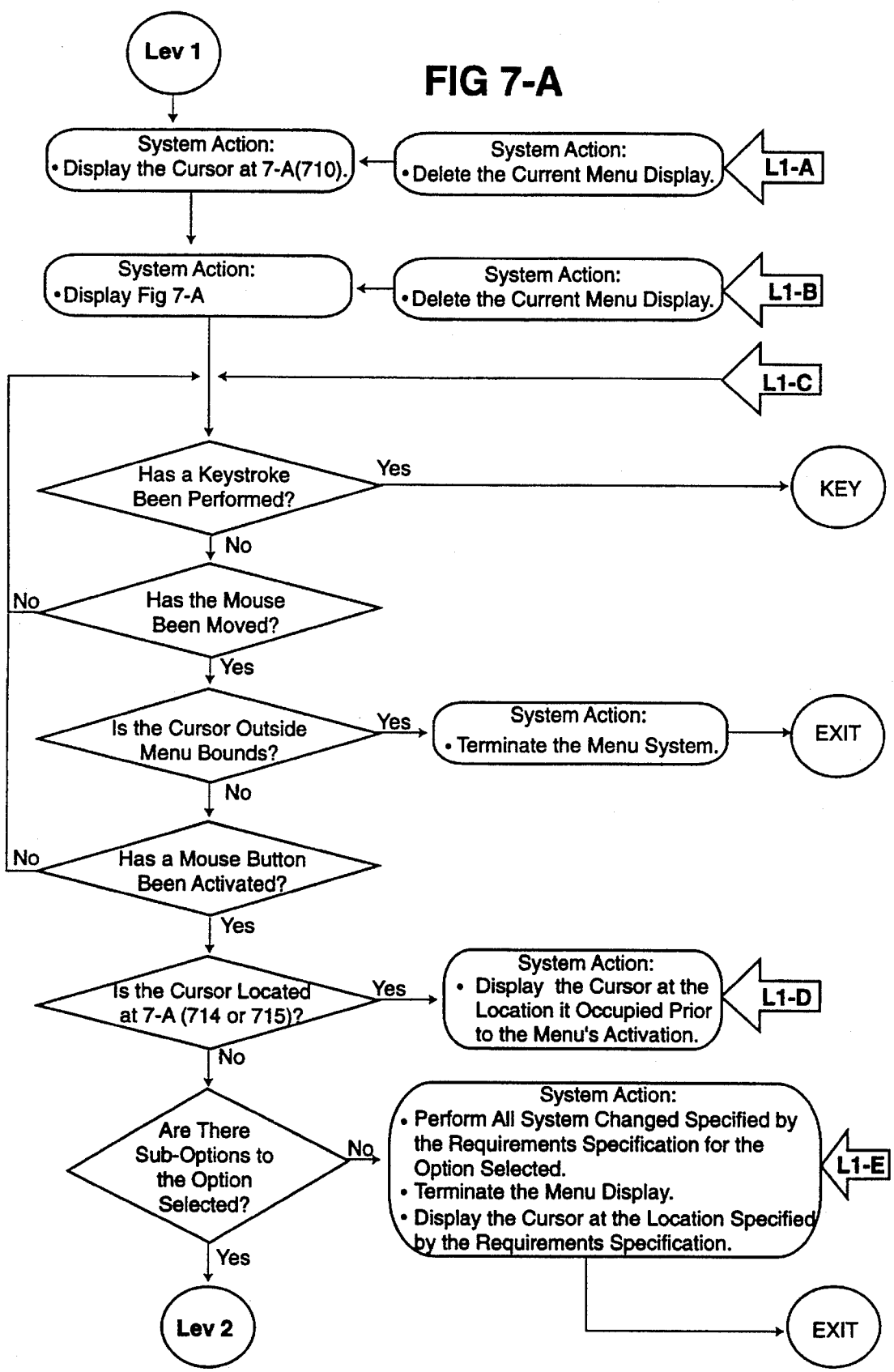
FIG 7-A

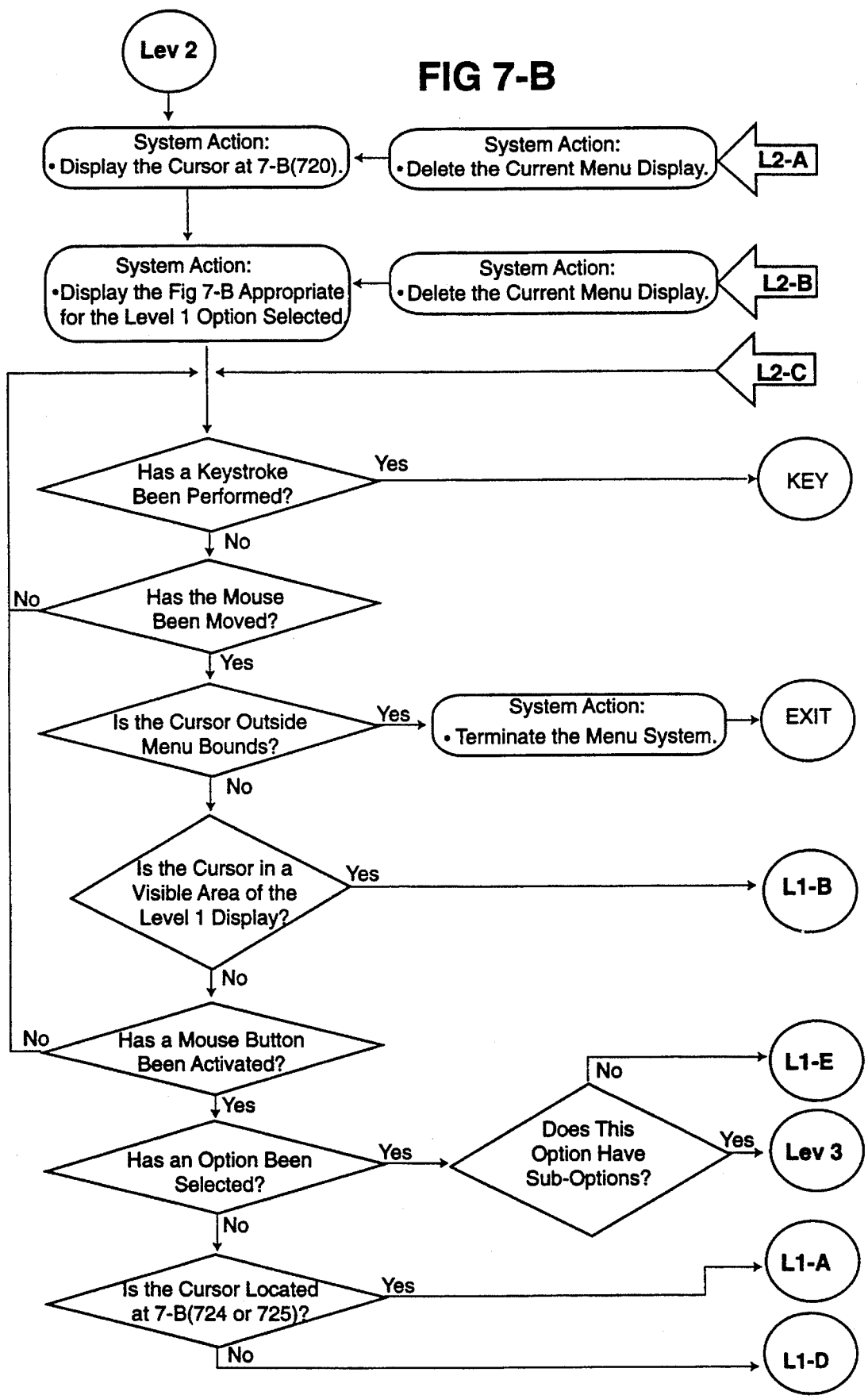
FIG 7-B

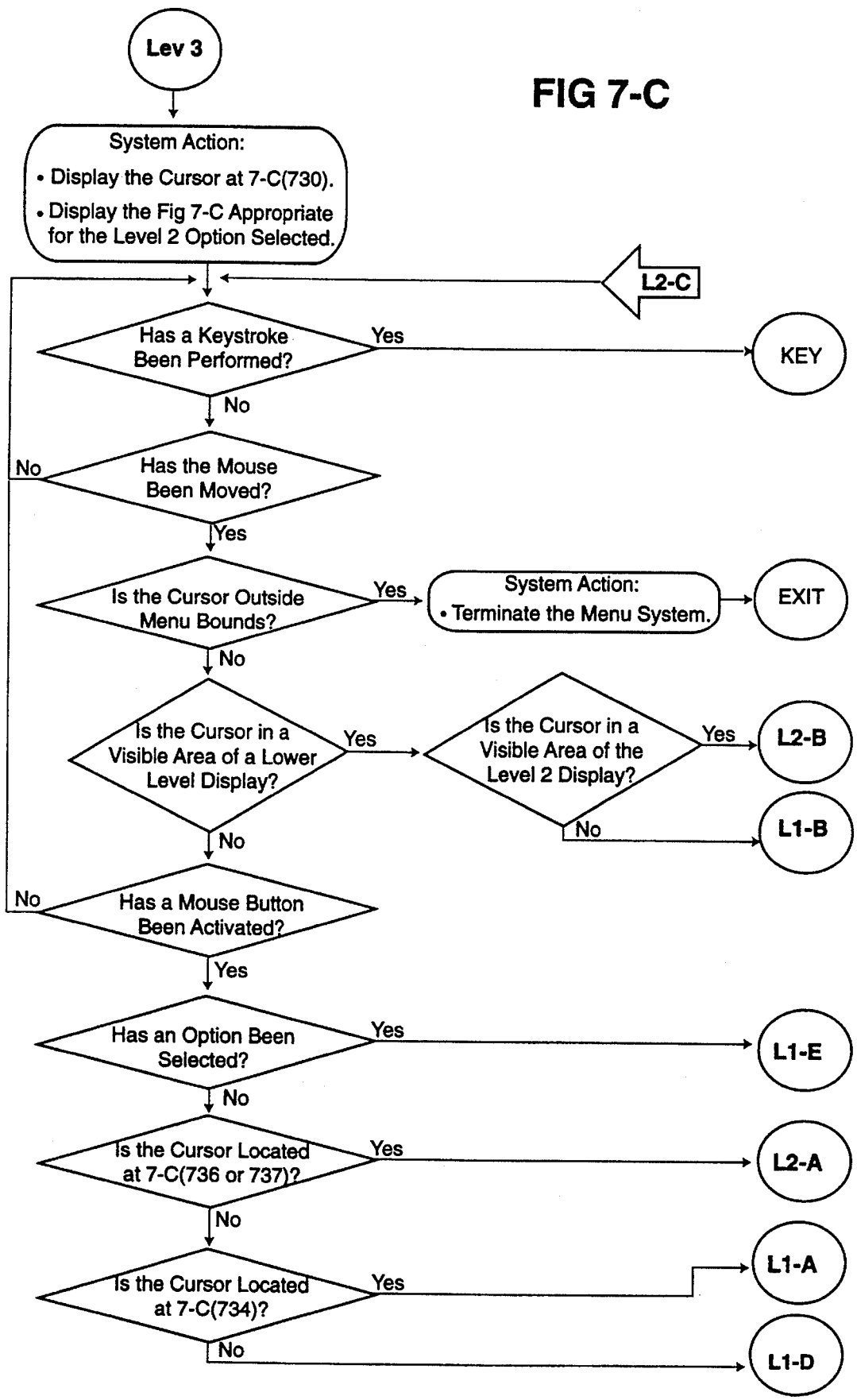
FIG 7-C

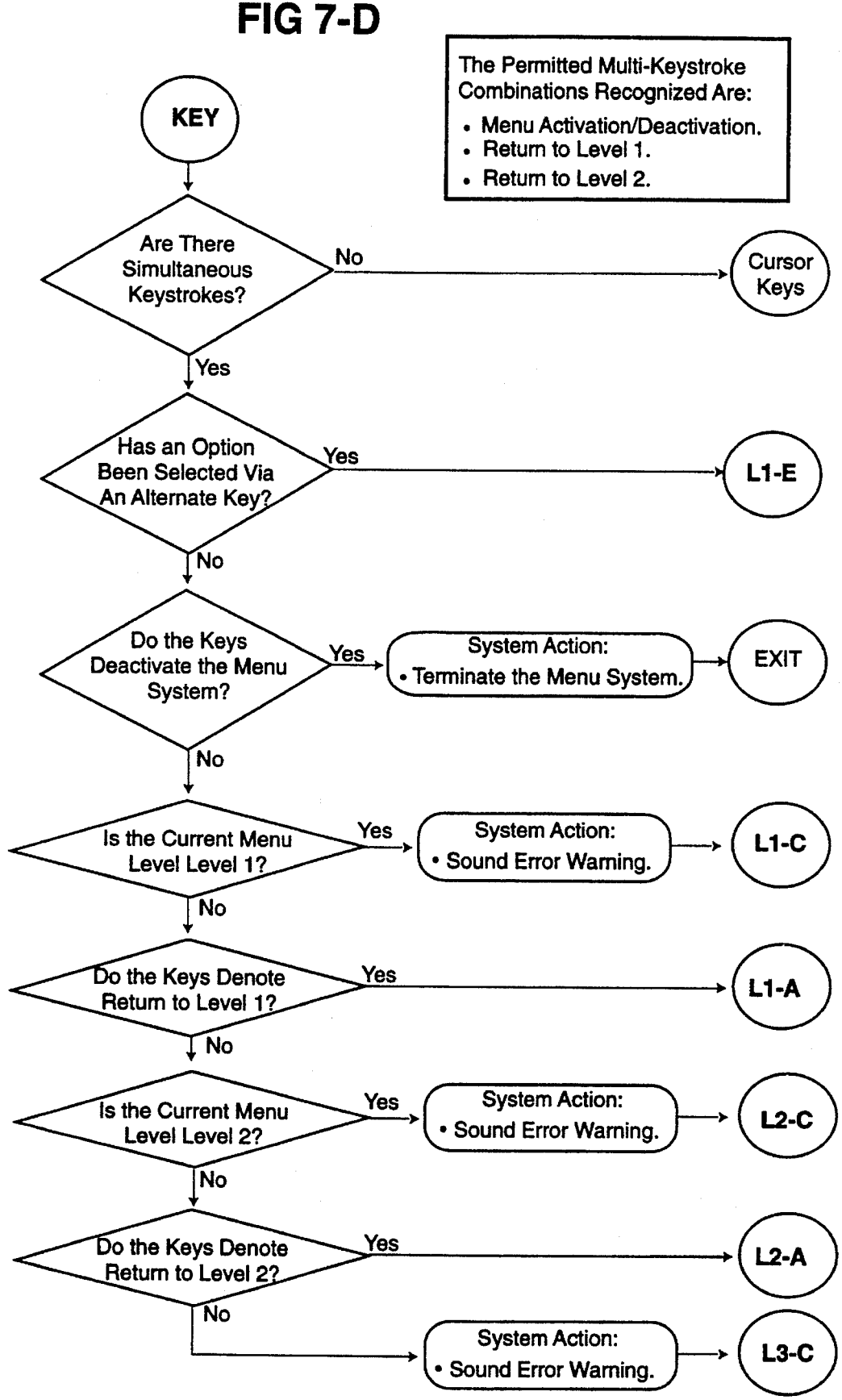
FIG 7-D

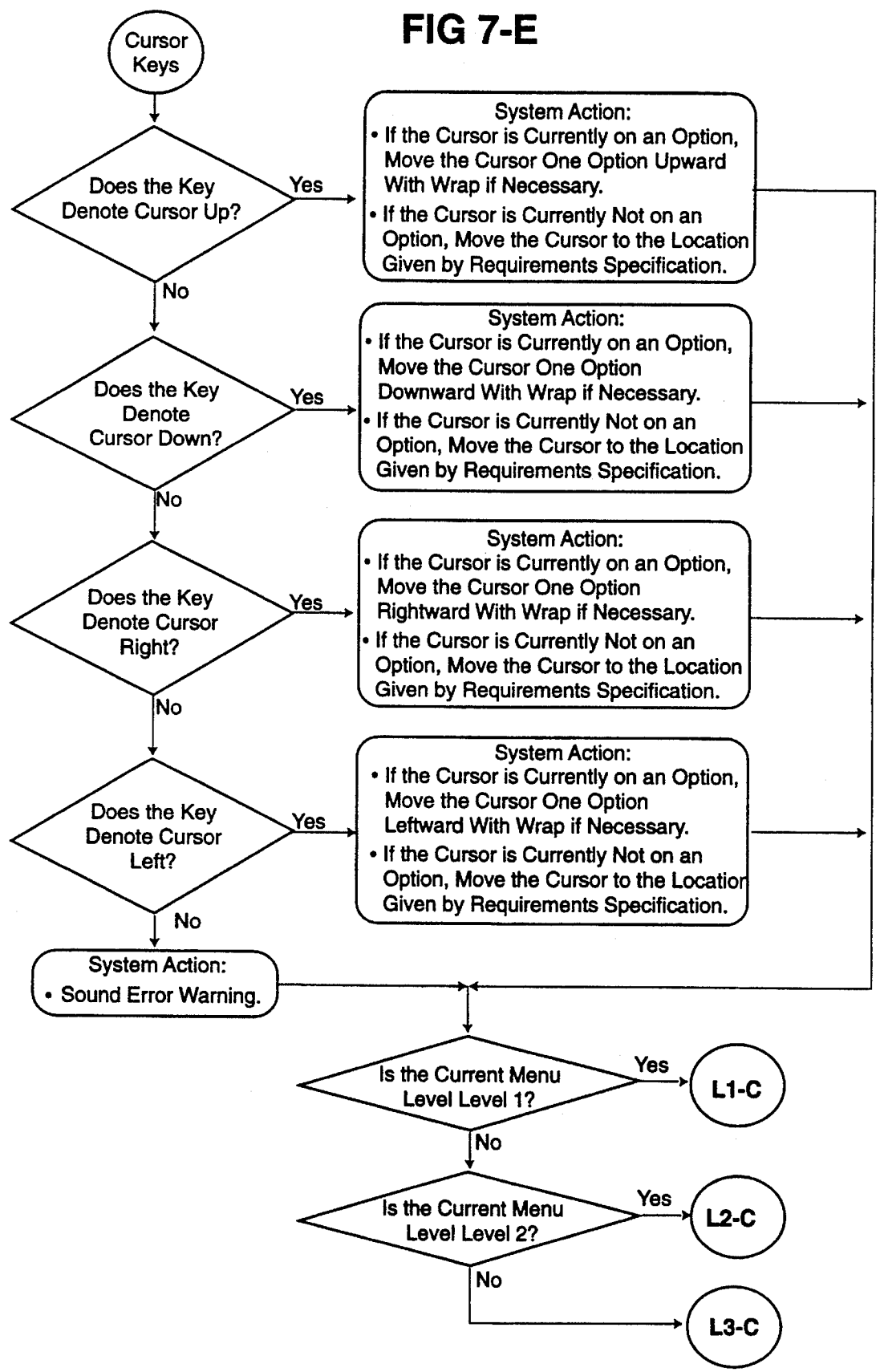
FIG 7-E

LINEAR-VIEWING/RADIAL-SELECTION GRAPHIC FOR MENU DISPLAY

BACKGROUND AND SUMMARY OF THE INVENTION

The present invention relates to the fields of operating systems, application software, menu structure and menu display graphics.

Computer/human interfaces permit users to submit data to and receive results from the computer system. Data which is input can be categorized as the submitting of parameters to control the operating system, the submitting of parameters to control the computer/human interface, the submitting of data to the application software and the submitting of requests for transformation of application data. Menu systems form a widely utilized method for the input of any of these data categories if the data: (1) can be described via a tree structure and (2) have either a nominal or rank order level of measurement. Sixteen to twenty options per level of a menu represents the maximum practical number of options when the menu system is utilized to manage a software system. The final level of options of a menu may solicit any class of data providing appropriate input technologies are integrated into the menu structure to receive other than nominal and rank order data. For a general discussion of the logic and constraints of menu systems see: Schneiderman, Ben, *Designing the User Interface: Strategies for Effective Human-Computer Interaction.* Addison-Wesley Publishing Co., 1987, pp. 85–133 and Mayhew, Deborah J., *Principles and Guidelines in Software Interface Design,* Prentice-Hall, 1992, pp. 113–174.

Variants of two approaches for the display of menu options predominate: (1) options appear displayed as vertical linear lists and (2) options of the menu's first level appear displayed as a horizontal list with higher level option lists displayed in vertical linear format. With vertical display, the menu's first level option list may either be permanently displayed in an infrequently utilized screen area or appear via "pop-up" display; i.e., be generated upon activation of the menu system and removed upon its deactivation. An example of the pop-up style is the menu system employed by Sun Microsystems, Inc. Sun Microsystems promotes the Open Look protocols and details its menu system in Sun Microsystems, Inc., *Open Look: Graphical User Interface Functional Specification,* Addison-Wesley Publishing Co., Inc., 1989. The NeXTstep system developed by NeXT Computer, Inc. permanently displays the first level options in vertical format. When selection of a first level option requires display of higher level option lists, they appear in vertical linear format adjacent to the parent display. The first level menu display offered by the Macintosh operating system of Apple Computer, Inc. and the Windows menu system of the Microsoft Corporation provide a permanent display of first level options in a list appearing horizontally at the top of the display screen. With both the Macintosh and Windows menu systems, selection of a first level option results in a "drop-down" display of the second level option list; i.e., display of second level options in a vertical, linear format immediately below the selected first level option. For menu systems based on display of linear lists, selection is affected by the user activating a specified input device within the target area defined for the option. The most prevalent input devices for menu control are the mouse and cursor control keys. For linearly displayed option lists, an option's target area comprises either an explicitly delimited or an implicitly present rectangular area surrounding the label or icon identifying the option. For a given level of menu display dimensions of these rectangular targets are either fixed during system design or are dynamically determined from the longest text string or icon employed to identify the option list to be displayed.

A graphic which permits vertical scanning of the option list represents the most efficient known method of data scanning. Users possessing average visual acuity have foveal vision which subtends 1 to 2 degrees. At typical screen distances this foveal angle permits simultaneous identification of two or three options when displayed at a typical height of 6 or 8 lines per inch. Horizontal and nonlinear display formats disallow multiple option identification per saccad/fixation and thus require users to expend more time performing the option scan. For general reference to saccads, fixation and symbol comprehension see Chapter 2 of Just and Carpenter, *The Psychology of Reading and Language Comprehension,* Allyn and Bacon, Inc., 1987. Studies of user scanning behavior indicate that visual searches of vertically formatted option lists are accomplished in three-fourths the time expended scanning the same lists when arranged horizontally. Although the absolute savings per menu scan is small, an extended terminal session can entail thousands of menu scans; the aggregation of such small benefits can noticeably improve a user's reaction to a human-computer interface system. The disadvantage of both vertical and horizontal linear formats is that the average distance the cursor is traversed to reach desired options is greater than is required with available alternate designs. Aggregate cursor travel is greatest with systems employing permanently displayed first level option lists since the user is required to traverse from the cursor's current location, to the menu, and return. For general reference to the mechanics of menu usage see: Chapter 6 of Kent L. Norman, *The Psychology of Menu Selection: Designing Cognitive Control of the Human/Computer Interface,* Ablex Publishing Corp., 1991.

A third style of menu display is the pie menu. The graphic of the pie menu presents option descriptors in horizontal alignment arrayed around the periphery of a circle. Each option of a pie menu lies within individual, pie-shaped targets having their apex angle at the circle center and having an angular extent of [360/(Number of Options)] degrees. Higher level displays are themselves pie menus but may have different dimensions due to different numbers of options and length of option labels. Display of high level option lists appear either as overlapping pies thus occluding lower level option display or in tiled format with each pie abutting its parent. The principle advantage of the pie menu is the ability to affect selection of any option by a similar, short cursor move into the target area of the desired option. The principle disadvantage of this menu style is that long option labels or numerous options necessitate displays of large diameter and thus consume extensive screen real estate. A concomitant problem is the need for the user to perform a separate saccad/fixation to identify most options while scanning the option list. For a general discussion of pie menus see Callhan, Hopkins, Weisner and Schneiderman, *An Empirical Comparison of Pie vs. Linear Menus,* CHI '88: Human Factors in Computing Systems, 1988.

When manipulating a menu user behavior comprises five possible activities: menu activation, forward traverse to first and higher level options, possible backward traverse from a current level to a prior menu level, selection of a leaf option with implicit menu deactivation, and explicit menu deactivation. When explicit menu activation is required this generally requires the user to press a specifically allocated key(s) to affect display of the first level option list. Forward menu traverse commonly utilizes mouse input, with option selection accomplished either by the point and click method or by the walking method (also called dragging). Point and click requires that the user traverse to the desired option and rapidly press and release (click) the designated mouse button. If a second level option list is attached to the selected first level option, the user traverses to the desired second level selection and clicks on that option. This is repeated until the highest level option has been selected. Walking selection with drop-down display requires the user to traverse from the current cursor location to the desired first level option, press the designated mouse button and, with the mouse button depressed, traverse the cursor to the second level option. If this is a leaf option the mouse button is released. If still higher level options exist, the user drags through one border (typically the right edge) of the current selection before dragging to the desired option of the new level. This is repeated until a leaf is reached. Walking selection with pop-up styles differ only in having the cursor appear centered in the menu's title area upon menu activation.

Menu systems with permanently displayed first level options traditionally provide for option selection via a keystroke to jump the cursor to the menu display with subsequent manipulation of a four cursor control keypad or some other defined four key set. Upon stroking the activation key(s), the cursor is jumped to the left-most position of the displayed first level option list. Each subsequent stroke on the four key set causes a cursor jump to a contiguous option. As example, stroking the left-most control key jumps the cursor one option to the left or wraps the cursor to the right-most option area if the cursor initially occupies the left-most option area. Auto repeat is typically provided when a cursor control key is held in the down position.

Backward menu traverse is conventionally provided to permit returning to a prior menu level. This cancels the current option choice and returns the menu system to the state appropriate to the lower level selected. Menu deactivation is conventionally provided in menu systems to manage either a single option selection per activation or multiple selections per activation. Selection of a leaf option under a single option per menu activation terminates all nonpermanent menu display. Display termination prior to leaf selection under the dragging method occurs upon release of the mouse button at any nonleaf location. Under the point-and-click method, either clicking outside the menu area or toggling the menu activation key terminates all nonpermanent menu display. When multiple inputs are permitted during a menu activation, two termination techniques are employed. For a predetermined number of inputs, the system counts the selections and terminates when that number is reached. For a variable number of selections the user is responsible for explicitly terminating the display.

While the foregoing menu management techniques may suffice for some applications in general, these conventional techniques require more effort than required if the same software control were affected using the present invention. The invention provides a menu graphic capable of displaying any typical number of options on any typical number of levels while affording the visual efficiency of vertical scanning combined with low physical effort of cursor motion found with the pie menu. These capabilities can be provided within a menu management framework which provides the capabilities reviewed above. Depending upon implementation strategy, the invention can be employed as a replacement in most extant menu systems or as the menu structure of a new software system.

In accordance with one aspect of the invention a computer menu selection system is provided to permit pointing device selection of a plurality of menu options by a user. The system comprises a plurality of option target areas, each target area corresponding to one of the menu options. The option target areas each, in part, comprise a generally rectangular area which contains the label of one of the menu options. The option target areas are disposed so that at least a portion of the rectangular areas are vertically arranged to define a generally vertical axis and to present at least a portion of the menu options as a vertically arranged list. The invention includes a means for establishing or defining an origin point which is offset from the vertical axis defined by the vertically arranged rectangular areas. The option target areas each further include a nonrectangular area, laterally adjacent the rectangular area, which have a plurality of boundaries which converge in a direction towards the origin point, or such convergence being alternatively described as divergence from the origin point. By this configuration, the option target areas are geometrically configured and arranged such that the user visually scans the list of menu options in a vertical direction and where the pointing device, when positioned at the origin point, acquires any of the option target areas with substantially equal movement.

For a more complete understanding of the invention, its objects and advantages, reference may be had to the following specification and to the accompanying drawings.

BRIEF DESCRIPTION OF THE DRAWINGS

FIG. 6-A, 6-B, and 6-C collectively FIG. 6) provide a generalized display of the menu: (1) in tiled configuration and (2) in overlay configuration, to illustrate a menu traverse of three levels, each level having differing numbers of options and labels of differing length.

FIG. 7-A, 7-B, 7-C, 7-D, and 7-E (collectively FIG. 7) comprise a flowchart employed in conjunction with FIG. 6 which illustrates application of the invention in a three level basic menu system generally applicable to software systems.

DETAILED DESCRIPTION OF THE PREFERRED EMBODIMENT

The invention seeks attainment of desirable values for two metrics of user activity during menu manipulation: (1) minimization of time to visually interpret the menu graphic and (2) minimization of expected physical effort to affect a suite of typical menu selections. In utilizing the invention to optimize these metrics the preferred embodiment of the innovation depends upon whether the invention is designed as an integral part of a new software product or replaces the menu system of an extant software product.

Figure 1:
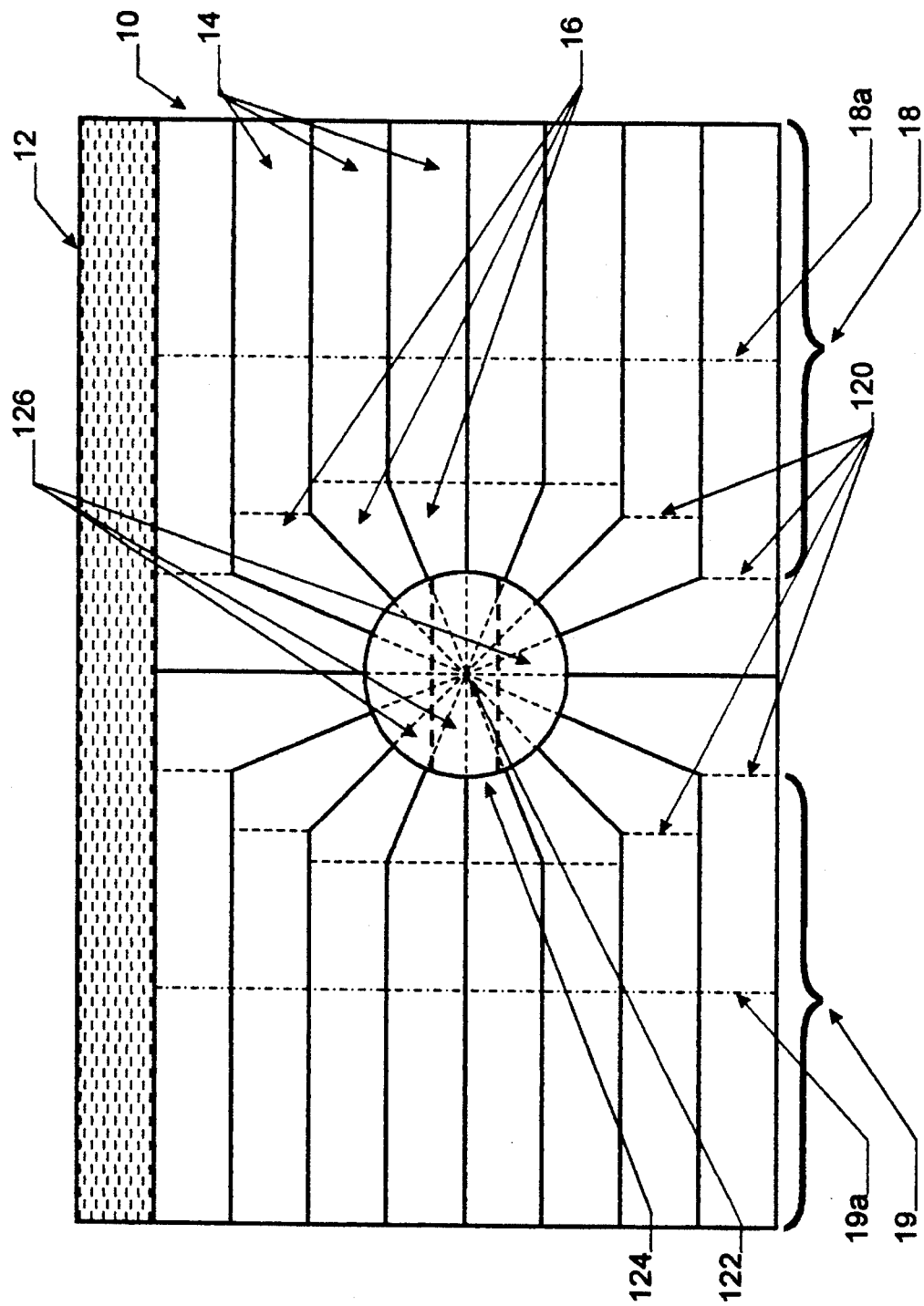
FIG. 1 is an exemplar sixteen option area menu shell illustrating the positional and dimensional characteristics for a generalized display of the menu graphic appropriate for all menu levels in accordance with the invention.

Reference 10 of FIG. 1 generally designates an exemplar sixteen option menu graphic shell; i.e., a menu graphic without depiction of labels. Area 12, abutting the top edge of the option areas is the identification area reserved for identification of the current menu. The individual option areas appear in two vertically arranged columns 18 and 19. As illustrated, each option area comprises the aggregation of a generally rectangular area 14 and a generally nonrectangular area 16 laterally adjacent to the rectangular area. In FIG. 1 dashed lines 120 illustrate the boundary between laterally adjacent rectangular and nonrectangular areas. These dashed lines appear for illustration purposes only, since the preferred embodiment would not employ a visually perceptible line to delimit the component areas of each option area. The actual number of option areas displayed is variable and depends upon the exigencies of the particular portion of the menu system being displayed during any activation of that system.

The vertically arranged rectangular areas each define a generally medial vertical axis 18a and 19a respectively. The menu graphic shell 10 also includes an origin establishing the central region 124 located generally at the confluence of the apex of the option areas, as illustrated. The diameter of 124 is determined by the exigencies of the software utilizing the invention and may be zero. The central region may be subdivided into a varying number of subregions 126 and utilized for system control as suggested by the exigencies of the software. The preferred utilization of the origin subregions is to make possible efficient backward traverse of the menu path as detailed by FIGS. 6 and 7. At the center of the central region is the origin point 122. Origin point 122 is offset from the vertical axis 18a and 19a and lies generally at the point where the boundaries of the nonrectangular areas 16 converge. The dashed lines within the central region 124 extending the borders of the nonrectangular regions to their convergence are for illustration purposes only, since the preferred embodiment will not display visually perceptual lines showing convergence within the central region.

Figure 2:
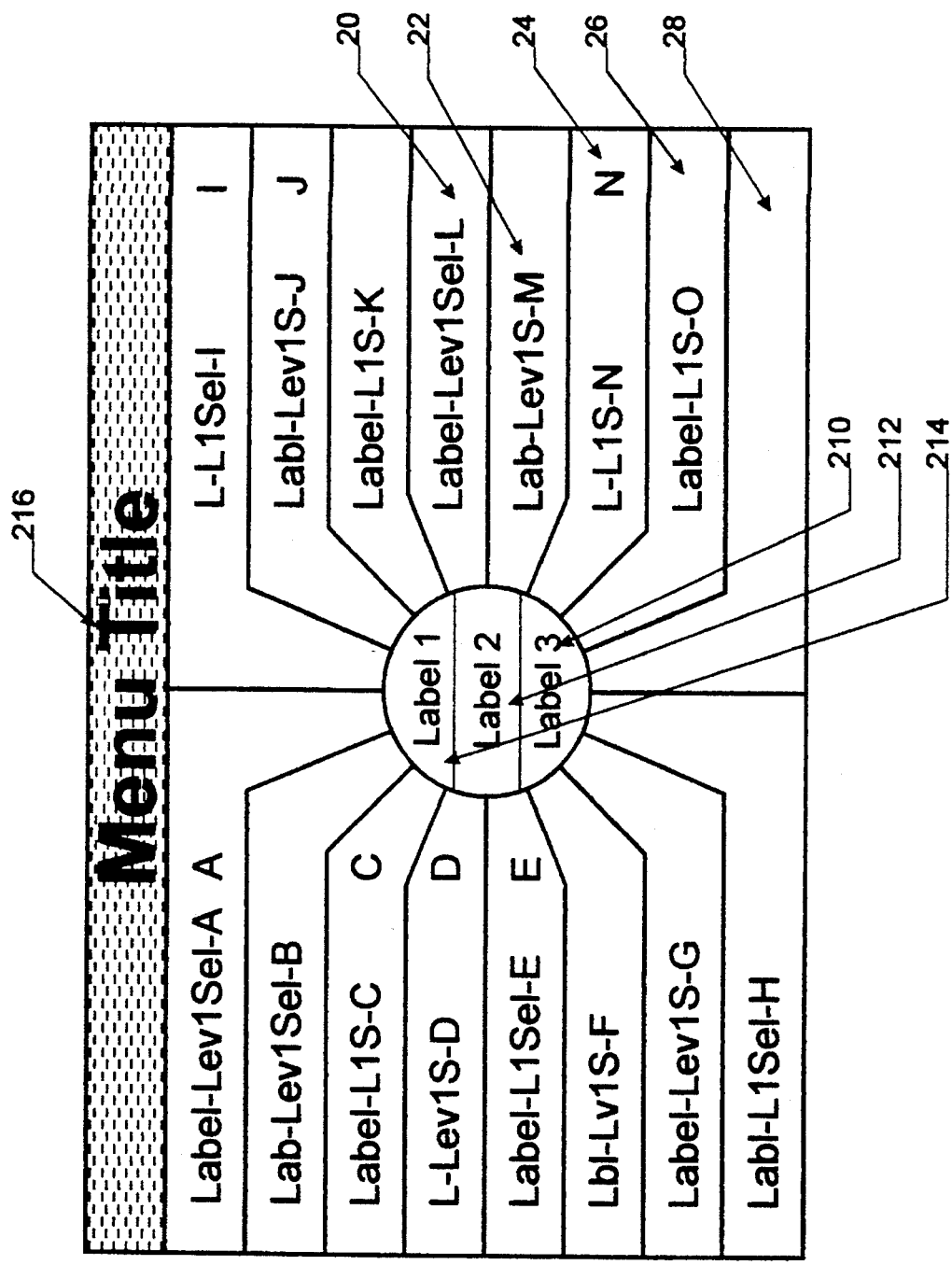
FIG. 2 replicates the information of FIG. 1 with the addition of labeling characteristics for a generalized display of the menu graphic appropriate for all menu levels in accordance with the invention.

FIG. 2 replicates FIG. 1 with the addition of labels chosen to suggest to the user the functionality of each active option area and central subregion. Option labels 20 and 22 illustrate that option labels are permitted to be of different length. The absence of a label 28 denotes an inactive option area. Presence of an inactive option area allows employment of a menu graphic shell containing an even number of option areas to offer an odd number of active options. While in FIG. 2 the lower right option area 28 is depicted as an inactive option area, the preferred embodiment allows any option area of any menu shell to be designed is an inactive option; the actual location of any such inactive option area being dependent upon software exigencies. One or more letters or symbols 24 may optionally appear in conjunction with an option label to represent a "Command-Key-Alternate." A Command-Key-Alternate enables the user to affect the same option selection via simultaneous keystroke that occurs when the cursor is clicked within the option area containing the Command-Key-Alternate symbol(s). The preferred embodiment permits any combination of option labels to be assigned whatever symbol(s) is deemed appropriate by exigencies of the software. Central subregion labels 210, 212, 214 are chosen to convey to the user the system functions activated upon selection of each such region. Central subregions may be employed for any purpose, but the preferred embodiment utilizes them to expedite return to a prior level of the current menu activation. The preferred embodiment defines a central subregion for each ancestor of the currently displayed menu level, with the root ancestor defined as the software system within which the menu system is embedded. When utilized in the preferred manner one central subregion will exist for each level of the currently active menu that has been traversed. To exemplify, if the highest menu level currently displayed is level 3, three central subregions would be available with labels to identify level #2, level #1 and the calling system as illustrated by FIG. 6-C items 636, 634, and 638 respectively. FIGS. 6 and 7 detail the preferred management of the central subregions. The menu title label 216 can be any identification of the currently displayed menu appropriate to the exigencies of the software. The preferred embodiment assigns the label of the selected option of the next lowest level display as illustrated by 637 of FIG. 6-C, 625 of FIG. 6-B, and 615 of FIG. 6-A. When the invention is employed in the preferred manner, mouse activation within 216 backtracks the menu management system one level.

Figure 3:
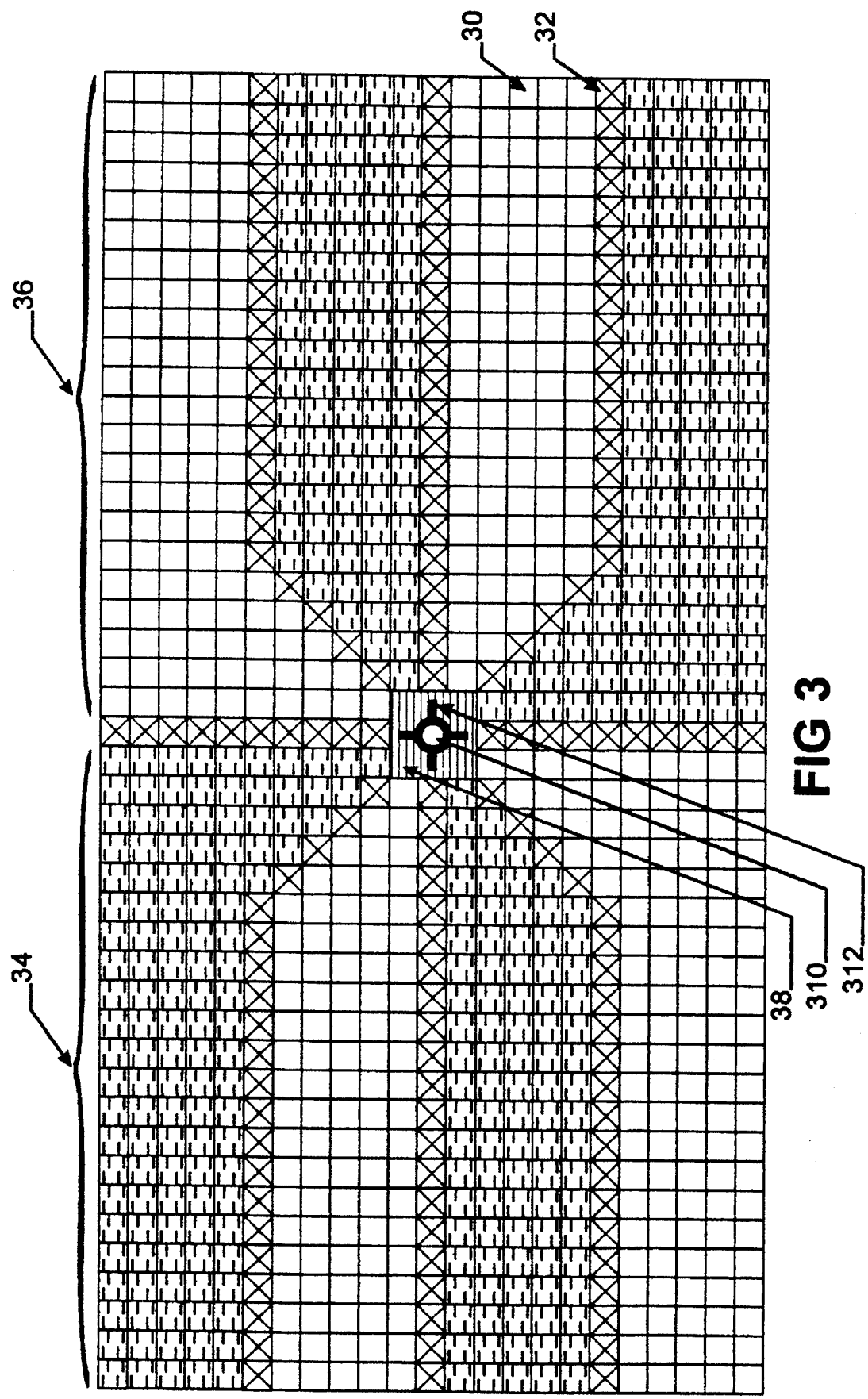
FIG. 3 is an exemplar eight option area menu shell illustrating the allocation of pixels within a bitmapped CRT screen to define each of the disjoint option areas; this allocation not providing for generation of central subregions to permit efficient backward menu traverse.
Figure 4:
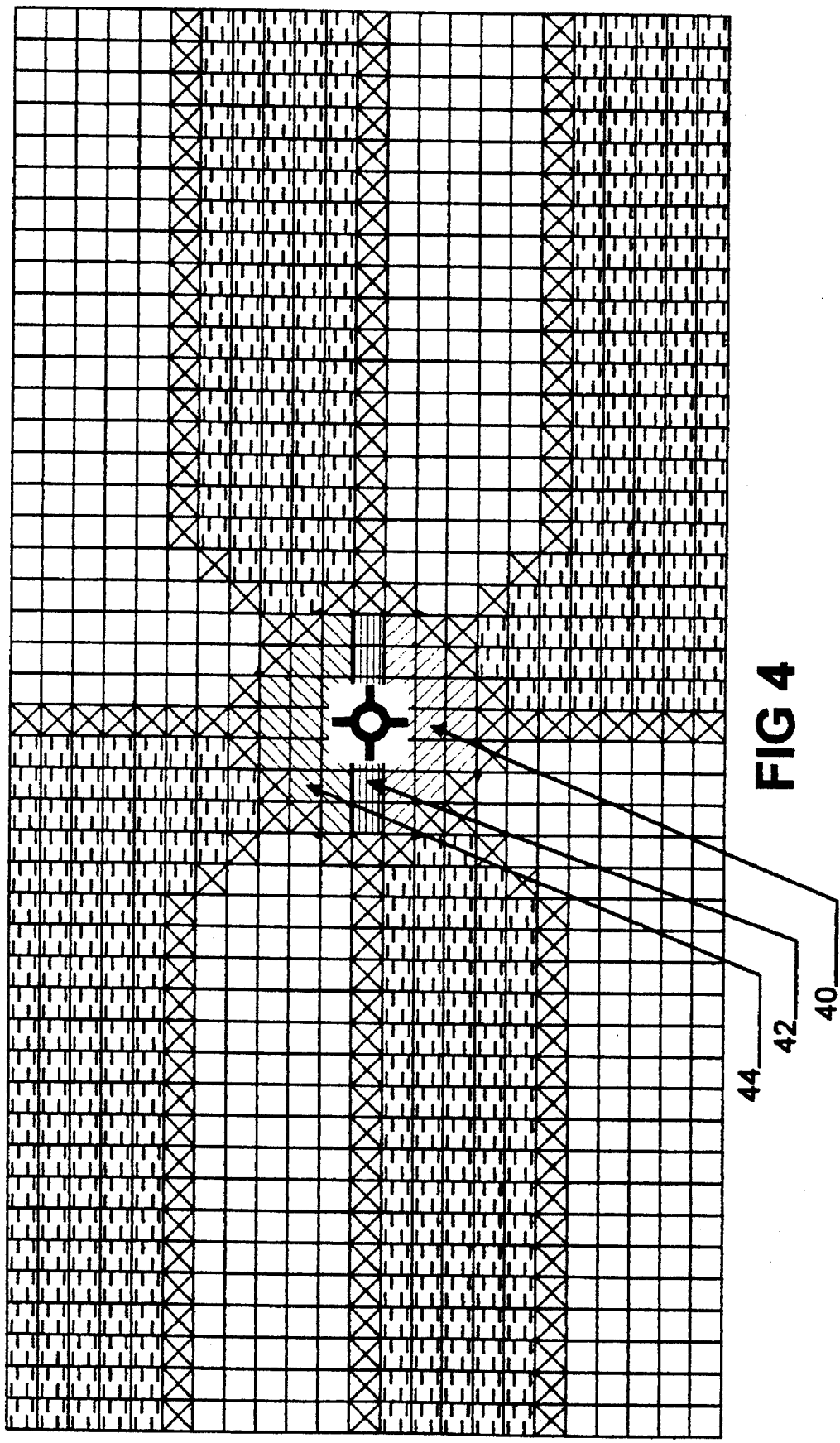
FIG. 4 replicates the information of FIG. 3 with the addition of an exemplar two component central subregion to permit efficient backward menu traverse.
Figure 5:
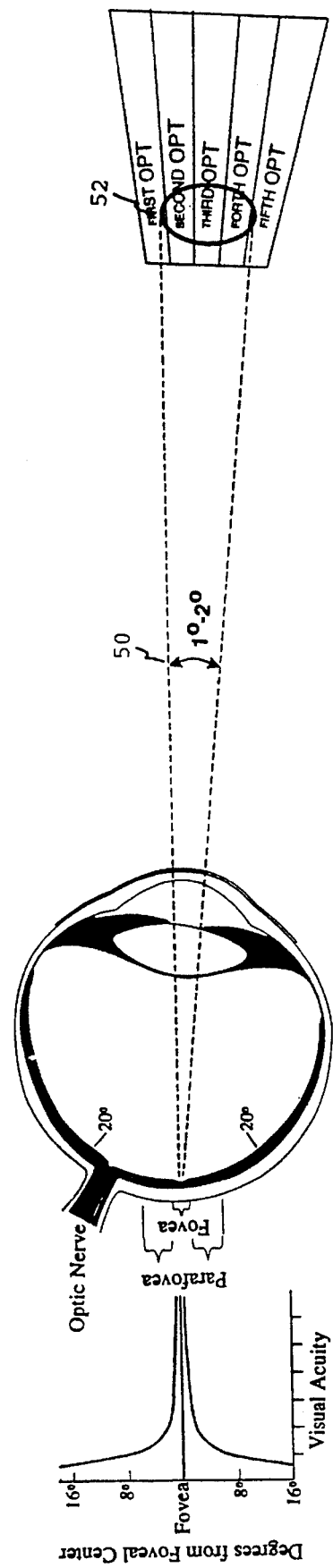
FIG. 5 is a cross-section view of the eye with associated graph depicting the symbol comprehension at varying degrees from the center of the fovea with implications to the field of symbol recognition at normal computing distance.

FIG. 3 depicts a feasible configuration of pixels 30 (pixel being generally defined as the smallest addressable unit of a bitmapped CRT screen) for an exemplar eight option menu shell having a central region diameter of 0. When users select options displayed as prescribed by the invention the number of erroneous selections is reduced by filling each option area with visually distinct color as suggested by the different gray shadings of 34 and 36. In general, option differentiation is accomplished by filling each individual option area with color or gray shading in a manner to disallow any option area being bordered by an option area of similar color or shade. In the preferred embodiment the option areas may but need not be bounded by visually distinct borders 32. FIG. 3 depicts one feasible cursor 310 as having the shape of a cross hair with the hot spot centered in the cursor peephole. This particular cursor shape does not imply this to be a limitation of the scope of the invention inasmuch as other cursor shapes are possible, as is exemplified by depiction of a different cursor shape in FIG. 6. The preferred embodiment employs system control to position the cursor hot spot 310 coincident with the origin point 122 upon activation of the menu system or after successful selection of an option from an ancestor menu display. The white rectangular area 38 depicts a 3×3 pixel region which does not belong to any option area. In the preferred embodiment the origin point 122 is located within the 38 region and thus not coincident with any pixel of any option area. The patent recognizes the possibility that with some renderings, the 38 region does not exist, and the central point 122 is assigned to a pixel of an option region. The patent further recognizes that the dimensions of 38 are dependent upon the exigencies of the software, FIG. 4 is equivalent to FIG. 3 but additionally illustrates pixel allocation within the central region when the diameter of the central region exceeds 0. FIG. 4 further illustrates division of the central region into two central subregions 40 and 44. Visual differentiation of the central subregions 40 and 44 is accomplished by filling the extent of each subregion area with color or gray shading in a manner to disallow any central subregion being bordered by a central subregion of similar color or shade. Each central subregion may optionally be bound by visually distinct borders 42.

The visual time expended during manipulation of any style of menu can entail: (a) a possible saccad and accompanying fixation to visually acquire the menu display, (b) one or more saccads/fixations to visually acquire the cursor; (c) one or more saccads/fixations to scan and comprehend menu options; (d) one or more saccads/fixations to reacquire the original screen area being processed; (e) one or more possible saccads/fixations to reacquire the cursor after menu display is terminated. A saccad to visually acquire the menu is generally not required when the menu is displayed via the pop-up method with the display centered at the cursor's current location. If users deem it undesirable to overlay the screen area currently being referenced, pop-up menu display can be affected by abutting the menu to a boundary of the interface object of current user interest. (An interface object is the graphic depiction of an instantiation of an input or output class as defined in the Object-Oriented Design meaning of the term. For general reference see: Peter Coad and Edward Yourdon, *Object-Oriented Design,* Prentice-Hall, Inc., 1991). The preferred embodiment of the patent employs system control to successively position the cursor at the confluence of the option areas as each level of menu is displayed. With this embodiment users need not locate the cursor prior to the visual scan of options as its exact position is known. For users possessing average visual acuity and viewing at a typical screen distance the foveal vision subtends 1 to 2 degrees, 50, which permits simultaneous identification of 2 or 3 options of approximately ⅙ inch height, 52, providing these options can be uniquely identified by their left-most portions. For any application of the invention embodied with these specifications the time expended performing the visual scan of options is minimized when option labels occupy horizontal areas having approximately ⅙ inch height and arranged in vertical columns. Upon termination of the menu display the system returns the screen and cursor to its premenu status altered as appropriate by any system action affected by any menu leaf selected. With the pop-up menu display occurring in a manner which overlays or abuts the screen area currently being referenced, visual time expended reacquiring the current task is minimized when the menu display is terminated.

Excluding menu applications which solicit leaf values that are not of normative or rank order measurement, the preferred embodiment of this patent is for each graphic of each menu level to possess the characteristics displayed in FIGS. 1 through 4. When so displayed the vertical linear search inherent to the invention provides greater time efficiency than occurs with the individual saccad and fixation required to scan options of the pie menu. The invention permits option selection at the physical effort level (as measured by Fitt's Index of Difficulty) inherent with the pie menu's short, radial cursor motions. This physical effort will on average be less than the efforts incurred through the greater expected cursor motion employed during option selection from linearly displayed option lists.

The Appendix presents a program written in the Adobe PostScript programming language capable of generating the menu graphic detailed by FIGS. 1 through 4. The Appendix also presents copies of screens of menu displays generated by the program which are representative of displays subsumed by this invention. For specific reference to the PostScript language see: Adobe Systems, Inc., *PostScript Language Reference Manual, 2nd Edition,* Addison-Wesley Publishing Co. Inc., 1990. The program permits generation of any desired number of option areas of that width necessary to contain the longest option label and of the height appropriate to the application. The program has provision to position labels in appropriate positions within the option areas, doing so in either all or all but one of the option areas generated. Provision is made for color differentiation between options and between subregion choices. The number of central subregions generated is based on the current level of display and has a program generated diameter. The program depicts menu's labeled with their parent option. The program provides for either tiled or overlayed display. In overlay display the direction and amount of offset is defined by parameter.

The program in the Appendix is intended to show how to provide a capability to display the graphic of this invention in the postscript environment. It is not intended to show a fully interactive, speed optimized interactive menu system. Naturally, a complete interactive menu system can readily be developed, taking the necessary hardware-specific and operation system-specific details into account. For general reference to the relation of user-interface systems and application systems see: Dan Olsen, *User Interface Management Systems: Models and Algorithms,* Morgan Kaufmann Publishers, 1992, and James Larson, *Interactive Software: Tools for Building Interactive User Interfaces,* Yourdon Press, 1992.

FIGS. 6 and 7 convey a preferred basic method of menu system management. In basic formulation, upon activation the preferred menu management system jumps the cursor under system control to the confluence of the apex of option targets; in FIG. 6-A to the origin point 610 of the first level menu display upon activation of the menu system, in FIG. 6-B to the origin point 620 of the second level menu display upon successful selection of a level 1 option having a submenu list, and in FIG. 6-C to the origin point 630 of the third level menu display upon successful selection of a level 2 option having a submenu list. If a software requires fourth level or higher display the cursor management procedure detailed by FIG. 7 is to be extended. When independent of other considerations, the preferred target acquisition method of the invention is the point-and-click method for each option level. To maintain consistency of the overall control strategy for new software or to conform with the control strategy of an extant software, the preferred embodiment of menu manipulation may be by dragging. Irrespective of whether exigencies dictate point-and-click or dragging, the physical aspects of option selection are independent between menu levels. If menu manipulation is by point-and-click, at menu activation the cursor is jumped to the center point of the first level option display, the mouse traversed into the desired option's target area and the appropriate button clicked. This sequence is repeated for each level. If menu manipulation is by dragging, upon menu activation the cursor is jumped to the center point of the first level option display, the mouse button depressed, a drag into the target area of the desired option is performed and the mouse button released. This sequence is repeated for each level. Upon selection of a leaf option the preferred cursor management with either manipulation technique is to jump the cursor under system control back to the premenu activation location provided this location is still defined after completion of action of the selected option. If the original cursor location is not defined, the cursor is to be managed as specified by the Requirements Specification. The preferred cursor management procedure additionally permits the user to reverse prior option selections and to terminate the menu system at anytime prior to selection of a menu leaf. Existence of the central region 124 and the ability to dynamically subdivide the central region into subregions 126 according to the highest currently displayed menu level improves the efficiency with which menu selections can be reversed. The preferred management of the central region entails the permanent presence of an option which returns the system to the state existing prior to menu activation upon the user's selection of this region. Preferred central region management further entails provision of one subregion for each prior level of menu transversed, said subregions to be labeled to identify the level to which it returns the menu system. Selection of a subregion generates the display appropriate to that level and jumps the cursor under system control to the central point of that display. The preferred cursor management incorporates traditional backward menu traverse as detailed in FIG. 7. FIG. 7-A, 7-B, and 7-C and thus encorporates prevailing cursor management with the preferred menu management methods detailed herein. When applied there will result the enhanced efficiency inherent in the menu graphics detailed by FIGS. 1 through 4. FIGS. 7-D and 7-E detail how prevailing menu control methods executed via the keyboard are integrated into the menu management control methods unique to the preferred embodiment of the invention which produce a fully configured, basic management system.

While the invention has been detailed and its benefits specified for the preferred embodiment, those skilled in the art will appreciate that modifications in the graphic appearance and application can be made without departing from the spirit and scope of the invention. For example, while the preferred embodiment is exemplified with differing numbers of options, alternate embodiments would be expected to employ still different numbers of options and could use alternate colors or shadings without departing from the spirit of the invention. The preferred embodiment is also illustrated with tiled higher level option lists abutting to the right and with overlapping option lists ordered down to the right (see FIG. 6). However, alternate embodiments could position higher order option lists in any direction convenient to utilization of screen real estate and to user comprehension. Persons skilled in the arts of generating computer graphics will be enabled to prepare alternate programs utilizing various programming language technologies without departing from the spirit and scope of the invention.

```
%*===========================================================================*
%*                                                                           *
%*                              APPENDIX                                     *
%*                                                                           *
%*    Adobe PostScript Program Exemplifying Graphic Display of the Patent    *
%*                                  With                                     *
%*                   Samples of Generated Screen Displays                    *
%*                                                                           *
%*===========================================================================*

%»************************  SPIDER MENU GRAPHIC  ************************
%                                                                           *
%   AUTHOR:    Stanley W. Driskell                                          *
%              4830 Washtenaw Ave. #C2                                      *
%              Ann Arbor, MI 48108                                          *
%                                                                           *
%   DATE:      Novemder 10, 1993                                            *
%              December 14, 1993 revised                                    *
%                                                                           *
%   PURPOSE OF PROGRAM:                                                     *
%     Generalized program for the generation of the Spider Menu graphic.    *
%     Capabilities provided comprise-                                       *
%        1. Provides an arbitrary number of option areas.                   *
%        2. Provides an arbitrary height of the option areas.               *
%        3. Provides an arbitrary length of the option areas.               *
%        4. Displays between 1 and 3 levels of menu graphics managed        *
%        5. Displays color differentiation between options.                 *
%        6. Displays the central region with return level labeling.         *
%        7. Displays the parent level selection in the menu identification. *
%        8. Displays in either tiled or overlayed mode.                     *
%        9. Sets the amount of offset in overlay mode via parameter.        *
%                                                                           *
%   UNITS:  Units are in PostScript points -- 72.27 points = 1 inch.        *
%                                                                           *
%   INPUTS: To alter parameters alter the values of the variables declared  *
%           in the section "DECLARE PARAMETERS"                             *
%     MaxLevel -> total levels desired, at least this many entries must     *
%                 appear in each of the the "Array" parameters              *
%     OptHeight -> Height of each option area                               *
%     OffsetX/Y -> Currently parameterized to be a function of OptHeight    *
%     Overlay -> "true" produces overlay; "false" produces tile display     *
%     TargetArray -> Option area to be Labeled as the selected option       *
%     TotOptArray -> Number of option areas of spider graphic               *
%     MaxLabelWidthArray ->Length of longest length of the label string     *
```

```
%        NOTE: Machine efficiency machine presupposes the maximum label length*
%              per display be hard coded into the menu data structure and       *
%              passed in as data.  The program makes this a parameter for       *
%              illustrative purposes.                                           *
%                                                                               *
% OUTPUT:      The spider menu graphic defined appears on the CRT.              *
%                                                                               *
% FONT:        As programed, labels are displayed in Helvetica-Bold font        *
%              To alter the font replace /Helvetica-Bold in code                *
%                                                                               *
%*******************************************************************************

%
%+++++++++++++++++++++++++++++   USER DECLARATIONS   +++++++++++++++++++++++++++
%

/MaxLevel              3     def
/OptHeight            20     def
/Overlay            true     def
/OffsetX   {OptHeight 3.0 mul}  def
/OffsetY   {OptHeight 1.5 mul}  def /TargetArray         [  5   7    1]  def
/TotOptArray         [  9  14   10]  def
/MaxLabelWidthArray  [90 60  70]  def /ParentOptArray [(Lev #1: (System)) (Lev #2: (L1-Sel)) (Lev #3:  (L2-Sel))] def %
% Screen control
%

/StrokeWidth    2.00  def
/StrokeGray     0.00  def
/OddOptGray     0.40  def
/LabelGray      0.50  def
/Gray100        1.00  def
/Gray90         0.90  def
/Gray80         0.80  def
/Gray70         0.70  def
/Gray60         0.60  def
/Gray40         0.40  def
/TargetGray     0.00  def

%
```

```
%++++++++++++++++++++++++   SPIDER OPTIONS GENERATION   +++++++++++++++++++++++
%
        ◆
/SpiderOptions {  %-- START OF SPIDEROPTIONS PROCEDURE %
% Generate parameters for display of option lables
%

/Temp {OptHeight  0.20  mul} def
   Temp 4 gt
      {/PosLabelY  4 def}
      {/PosLabelY  Temp def}
   ifelse
   /NegLabelY {OptHeight PosLabelY sub} def
   /Helvetica-Bold findfont OptHeight PosLabelY sub scalefont setfont %
%  Allow for an odd number of options
%

/Temp TotOpt def
   /OddNumbOfOpts false def
   Temp  2  div  dup  truncate  gt
      {
          /TotOpt {Temp 1  add} def
          /OddNumbOfOpts true def
      } if %
% Calculate designators for location of the current option
%

/HalfOpt         {TotOpt  2  div}  def
/QuarterOpt      {TotOpt  4  div}  def
/TruncQuarterOpt {QuarterOpt truncate}  def %
% Find whether there is an odd or even number of opts per column
%

QuarterOpt  TruncQuarterOpt  eq
    {/EvenOptsInCol  true   def}     % Even number of options per side
    {/EvenOptsInCol  false  def}     % Odd  number of options per side
ifelse
```

```
%
% Calculate BaseAngle and BaseHeight
%

/OptAngle    {360 TotOpt div}  def
EvenOptsInCol
   {  %IF
      /BaseAngle   0  def
      /BaseHeight  0  def
   }
   {  %ELSE
      /BaseAngle  {OptAngle   2  div}  def
      /BaseHeight {OptHeight  2  div}  def
   } ifelse %
% Calculate displacement of option labels
%

EvenOptsInCol
   {/TempHeight  OptHeight   def  /TempAngle  OptAngle   def}
   {/TempHeight  BaseHeight  def  /TempAngle  BaseAngle  def}
ifelse
/RightLabelX {TempHeight  TempAngle  dup  cos  exch  sin  div  mul}  def
RightLabelX  6  add  RadiusCentralCircle  lt
   {/RightLabelX {RadiusCentralCircle  6  add}  def}  if
/LeftLabelX  8  def
/OptWidth    {RightLabelX  MaxLabelWidth  add}  def %
% Translate axis for overlayed display
%

LevelNo  0  gt  {
   Overlay
      {/TempX {OptWidth  OldOptWidth  sub  OffsetX  add}  def
       /TempY {OldQuarterOpt  QuarterOpt  sub  OptHeight  mul  OffsetY  sub}  def}
      {/TempX {OldOptWidth  OptWidth  add}  def
       /TempY {OldQuarterOpt  QuarterOpt  sub  OptHeight  mul}  def}
   ifelse
   TempX  TempY  translate
} if %
%******************  OPTION DISPLAY PROCEDURE  **********************
%
```

```
/OptionDisplay {   %-- START OF OPTION DISPLAY SUB-PROCEDURE

%
% Calculate column location, CurrOptColLoc, and set X-offset for start of Label
%

CurrOptNo  HalfOpt  gt
    {   %IF                    -- Current Opt in located in right col
        /CurrOptInRightCol  true  def
        /CurrOptColLoc  {CurrOptNo  HalfOpt  sub}  def
        /LabelX  RightLabelX  def
    }
    {   %ELSE                  -- Current Opt in located in left col
        /CurrOptInRightCol  false  def
        /CurrOptColLoc  CurrOptNo  def
        /LabelX  {OptWidth  LeftLabelX  sub  neg}  def
} ifelse %
%  Calculate curr opt tag, quadrent number, & set Y-offset to Label origin
%

EvenOptsInCol
    {  %IF                     -- There is an even number of options per column
        CurrOptColLoc  QuarterOpt  gt
            {  %IF             -- Current option is in the lower half of menu
                /CurrOptQuadTag  {CurrOptColLoc  QuarterOpt  1  add  sub}  def
                /IncLabelY  {NegLabelY  neg}  def
                CurrOptInRightCol
                    {/CurrQuad  3  def}
                    {/CurrQuad  2  def}
                ifelse
            }
            {  %ELSE           -- Current option is middle option or above
                /CurrOptQuadTag  {QuarterOpt  CurrOptColLoc  sub}  def
                /IncLabelY  PosLabelY  def
                CurrOptInRightCol
                    {/CurrQuad  0  def}
                    {/CurrQuad  1  def}
                ifelse
            } ifelse
    } if EvenOptsInCol  not
    {%IF                       -- There is an odd number of options per column
```

```
        /RoundUp   {TruncQuarterOpt  truncate  1  add}   def
        CurrOptColLoc   RoundUp   gt
            {%IF                     -- Current option is in the lower half of menu
                /CurrOptQuadTag  {CurrOptColLoc   RoundUp   sub}   def
                /IncLabelY    {NegLabelY   neg}   def
                CurrOptInRightCol
                    {/CurrQuad   3   def}
                    {/CurrQuad   2   def}
                ifelse
            }
            {  % ELSE                -- Current option is middle option or above
                /CurrOptQuadTag  {RoundUp   CurrOptColLoc   sub}   def
                /IncLabelY    PosLabelY   def
                CurrOptInRightCol
                    {/CurrQuad   0   def}
                    {/CurrQuad   1   def}
                 ifelse
            } ifelse
    } if %
% Determine:
%   Option corners nearest to and furtherest from origin point.
%   Width of Option:  = PointX4 for Option with Tag = 0 plus MaxLabelWidth
%   Displacement of Right Column labels from X= 0
%

EvenOptsInCol
    {  %IF                         -- Even number of options per column
       CurrOptQuadTag   0   eq
         { %IF                     -- Even options per column;  Opt Tag =0
            /NearAngle   0   def
            /PointY1     0   def
            /PointX1     0   def
            /NearXSpan   OptWidth  def
            /PointY4        {PointY1   OptHeight   add}   def
         }
         { %ELSE                   -- Even options per column;  Opt Tag >0
            /NearAngle  {OptAngle     CurrOptQuadTag   mul}   def
            /PointY1    {OptHeight    CurrOptQuadTag   mul}   def
            /NearCotan  {NearAngle    cos  NearAngle   sin   div}  def
            /PointX1    {PointY1      NearCotan  mul}   def
            /NearXSpan  {OptWidth     PointX1    sub}   def
         }   ifelse /PointY4     {PointY1   OptHeight  add}   def
```

```
        /FarAngle    {NearAngle OptAngle  add}  def
        /FarCotan    {FarAngle  cos FarAngle  sin  div}  def
        /PointX4     {PointY4   FarCotan  mul}  def
        /FarXSpan    {OptWidth  PointX4   sub}  def
    }
    {   %IF                            -- Odd number of options per column
        CurrOptQuadTag  0   eq
            {   %IF                    -- Odd options per column;  Opt Tag =0
                /PointY1     BaseHeight def
                /IncLabelY   {NegLabelY  neg} def
                /NearCotan   {BaseAngle  cos BaseAngle  sin  div}  def
                /PointX1     {PointY1    NearCotan mul}  def
                /NearXSpan   {OptWidth   PointX1   sub}  def
                /FarXSpan    NearXSpan  def
            }
                {   %ELSE              -- Odd options per column;  Opt Tag >0
                /TempOpt     {CurrOptQuadTag  1  sub}  def
                /PointY1     {OptHeight TempOpt  mul  BaseHeight add} def
                /NearAngle   {OptAngle  TempOpt  mul  BaseAngle  add} def
                /NearCotan   {NearAngle cos NearAngle  sin  div}  def
                /PointX1     {PointY1    NearCotan mul}  def
                /NearXSpan   {OptWidth   PointX1   sub}  def
                /PointY4     {PointY1    OptHeight add}  def
                /FarAngle    {NearAngle OptAngle  add}  def
                /FarCotan    {FarAngle  cos FarAngle  sin  div}  def
                /PointX4     {PointY4   FarCotan  mul}  def
                /FarXSpan    {OptWidth  PointX4   sub}  def
            } ifelse
    } ifelse %
% Determine the direction of stroking segments by quardant
%

CurrQuad  0   eq  CurrQuad  3   eq   or
    {/XSign   1  def}
    {/XSign  -1  def}
ifelse CurrQuad  2   lt
    {/YSign   1  def}
    {/YSign  -1  def}
ifelse %
% Stroke the option
```

32

```
%
newpath
    0.0  0.0  moveto
    PointX1  XSign  mul  PointY1  YSign  mul  lineto
    NearXSpan  XSign  mul  0.0  rlineto
    EvenOptsInCol
        {%IF
            0.0  OptHeight  YSign  mul  rlineto
        }
        {%ELSE
            CurrOptQuadTag  0  eq
                {0.0  OptHeight  neg  rlineto}
                {0.0  OptHeight  YSign  mul  rlineto}
            ifelse
        } ifelse
    FarXSpan  XSign  mul  neg  0.0  rlineto
closepath %
% If an odd number of options is specified, white fill the lower-right option
%
    /OddLastOpt  {OddNumbOfOpts  TotOpt  CurrOptNo  eq  and}  def
    CurrOptNo  CurrOptNo  2  div  truncate  2  mul  sub  0  eq
        {/EvenCurrOpt  true  def}
        {/EvenCurrOpt  false  def}
    ifelse EvenOptsInCol
        {
           CurrOptInRightCol
              {
                 EvenCurrOpt
                    {Gray100  setgray}
                    {Gray80  setgray}  ifelse
              }
              {
                 EvenCurrOpt
                    {Gray80  setgray}
                    {Gray100  setgray}  ifelse
              } ifelse
        }
        {
           CurrOptInRightCol
              {
                 EvenCurrOpt
```

```
                {Gray100   setgray}
                {Gray80    setgray}  ifelse
            }
            {
              EvenCurrOpt
                  {Gray100   setgray}
                  {Gray80    setgray}  ifelse
              } ifelse
        } ifelse OddLastOpt {OddOptGray  setgray}  if gsave
        fill
    grestore StrokeGray    setgray
    StrokeWidth   setlinewidth stroke %
% Display option script
%

OddLastOpt  not
    {
        LabelX  PointY1    YSign   mul  IncLabelY  add  moveto
        gsave
            Target  CurrOptNo   eq
                { %IF
                   StrokeGray   setgray
                   (TARGET)  show
                }
                { %ELSE
                   StrokeGray   setgray
                   (LABEL)   show
                } ifelse
        grestore
    } if
} def   %-- End of OPTIONDISPLAY SubProcedure 1  1  TotOpt
        {
            /CurrOptNo    exch    def
            OptionDisplay
```

```
        } for

} def %-- End OF SPIDEROPTION Procedure

%
%++++++++++++++++++++   CENTRAL REGION DISPLAY PROCEDURES   ++++++++++++++++++++
%
%************************   CentralDisplay1   ******************************

/CentralDisplay1 {

/Helvetica-Bold findfont  10   scalefont  setfont
   (Sys) stringwidth  pop   /CentralSL  exch  def newpath
      0  0   RadiusCentralCircle  0  360  arc
   closepath
   gsave
      Gray100 setgray
      fill
   grestore
   StrokeGray    setgray
   StrokeWidth   setlinewidth
   stroke newpath
      CentralSL 2  div  neg  4  neg  moveto
   closepath
   gsave
      StrokeGray setgray
      (Sys)   show
   grestore
} def   %-- End of CENTRALDISPLAY1 Procedure %
%**********************   CentralDisplay2   ****************************
%

/CentralDisplay2 {

/Helvetica-Bold findfont  10  scalefont  setfont
   (Sys) stringwidth  pop  /CentralSL  exch  def
   (Lev1) stringwidth  pop  /CentralLL  exch  def newpath                %-- generate upper segment
      0  0   RadiusCentralCircle  0  180  arc
```

```
    closepath
    gsave
       Gray60 setgray
       fill
    grestore
    StrokeGray    setgray
    StrokeWidth   setlinewidth
    stroke newpath              %-- generate lower segment
       0  0   RadiusCentralCircle  180  360  arc
    closepath
    gsave
       Gray100 setgray
       fill
    grestore
    StrokeGray    setgray
    StrokeWidth   setlinewidth
    stroke newpath
       CentralLL 2   div  neg   4   moveto
    closepath
    gsave
       StrokeGray setgray
       (Lev1)  show
    grestore newpath
       CentralSL 2   div  neg  12  neg   moveto
    closepath
    gsave
       StrokeGray setgray
       (Sys)  show
    grestore
} def  %-- End of CENTRALDISPLAY2 Procedure %
%********************** CentralDisplay3 ****************************

/CentralDisplay3 {

/Helvetica-Bold  findfont  10  scalefont  setfont
   (Sys)   stringwidth  pop  /CentralSL  exch  def
```

```
(L#1) stringwidth pop /CentralLL exch def

/StartSX  {CentralSL  2  div  neg} def
/StartLX  {CentralLL  2  div  neg} def

/CY {RadiusCentralCircle  3  div} def
/CX {RadiusCentralCircle  RadiusCentralCircle mul
     CY  CY  mul  sub  sqrt} def
/StartAngle1 {CY  CX  atan} def
/EndAngle1   {180  StartAngle1  sub} def
/StartAngle3 {180  StartAngle1  add} def
/EndAngle3   {360  StartAngle1  sub} def newpath              %-- generate upper segment
   CX  CY   moveto
   0   0    RadiusCentralCircle  StartAngle1  EndAngle1  arc
closepath
gsave
   Gray60 setgray
   fill
grestore
StrokeGray   setgray
StrokeWidth  setlinewidth
stroke newpath              %-- generate middle segment
   CX  CY    moveto
   CX  neg   CY  lineto
   0   0     RadiusCentralCircle  EndAngle1  StartAngle3  arc
   CX  CY    neg  lineto
   0   0     RadiusCentralCircle  EndAngle3  StartAngle1  arc
closepath
gsave
   Gray100 setgray
   fill
grestore
StrokeGray   setgray
StrokeWidth  setlinewidth
stroke newpath              %-- generate lower segment
   CX  CY   neg  moveto
   CX  neg  CY   neg  lineto
   0   0    RadiusCentralCircle  StartAngle3  EndAngle3  arc
closepath
gsave
```

```
    Gray60 setgray
    fill
grestore
StrokeGray    setgray
StrokeWidth   setlinewidth
stroke newpath
    StartLX   CY  2   add   moveto
closepath
gsave
    StrokeGray setgray
    (L#1)   show
grestore newpath
    StartSX   4   neg   moveto
closepath
gsave
    StrokeGray setgray
    (Sys)   show
grestore newpath
    StartLX   CY 10   add   neg   moveto
closepath
gsave
    StrokeGray setgray
    (L#2)   show
grestore
} def   %-- End of CENTRALDISPLAY3 Procedure

%
%+++++++++++++++++++++++  LABEL DISPLAY PROCEDURE   +++++++++++++++++++++++
%

/LabelDisplay {
   0.0  setgray
   /TitleBoxCornerX   {OptWidth 1 add neg} def
   /TitleBoxCornerY   {QuarterOpt OptHeight mul} def
   /TitleBoxWidth     {OptWidth 1 add 2 mul} def
   TitleBoxCornerX    TitleBoxCornerY  TitleBoxWidth  OptHeight  rectfill
```

38

```
    /ParentLabel {ParentOptArray LevelNo get} def
    /TitleX {ParentLabel stringwidth pop 2 div neg} def
    /TitleY {TitleBoxCornerY PosLabelY add} def
    TitleX TitleY moveto
    1.0 setgray
    ParentLabel show
} def    %-- End of LABELDISPLAY Procedure

%
%++++++++++++++++++++++++  GENERATE SPIDER MENU  ++++++++++++++++++++++++++
%

150 250 translate
/OldOptWidth    0   def
/OldQuarterOpt  0   def 0 1 MaxLevel 1 sub
  {
     /LevelNo exch def %
% Generate parameters
%
     TargetArray          LevelNo get /Target        exch def
     TotOptArray          LevelNo get /TotOpt        exch def
     MaxLabelWidthArray   LevelNo get /MaxLabelWidth exch def
     /RadiusCentralCircle  18 def
     /Temp {TotOpt 1 add 2 div truncate 2 div OptHeight mul} def
     RadiusCentralCircle Temp gt {/RadiusCentralCircle Temp def} if %
% Generate Spider Options
%

SpiderOptions
     /OldOptWidth     OptWidth    def  %--Basis for Offset management
     /OldQuarterOpt   QuarterOpt  def %
% Generate Title Display
%

LabelDisplay

%
```

```
% Generate Labeled Central Region
%
      LevelNo 0 eq {CentralDisplay1}  if
      LevelNo 1 eq {CentralDisplay2}  if
      LevelNo 2 eq {CentralDisplay3}  if } for showpage
```

Having thus described my invention, what I claim as novel and desire to secure by Letters of Patent is the following:

1. A computer menu selection system for pointing device selection of a plurality of menu options by a user, comprising:

a computer system for generating a plurality of option target areas, each target area corresponding to one of said menu options;

said option target areas each in part comprising an active generally rectangular area responsive to pointing device selection which contains one of said menu options;

said option target areas being disposed such that each of said rectangular areas is vertically arranged in one of two parallel columns, each column defining a generally vertical axis and to present said menu options as two vertically arranged lists, each list being justified along a line;

said computer system including an origin establishing means for defining an origin point which is offset from each of said vertical axes;

said option target areas each further comprising an active nonrectangular area responsive to pointing device selection and laterally adjacent said rectangular area and having a plurality of boundaries which converge at said origin point;

whereby said option target areas are geometrically configured and arranged such that the user visually scans said list of menu options in a vertical direction and wherein said pointing device, when positioned at said origin point, allows a user to select any of said option target areas with substantially equal movement.

2. The menu selection system of claim 1 further comprising means for automatically positioning the pointing device at said origin point.

3. The menu selection system of claim 1 wherein said option target areas are disposed such that a first portion of said rectangular areas are vertically arranged to define a first generally vertical axis and a second portion of said rectangular areas are vertically arranged to define a second generally vertical axis offset from said first axis, wherein said first and second portions present first and second vertically arranged lists.

4. The menu selection system of claim 3 wherein said origin point is disposed between said first and second axes.

5. The menu selection system of claim 1 wherein said vertically arranged list is presented using characters of about one-sixth of an inch in height, whereby for each eye fixation, multiple lines of vertically proximal menu options fall upon the fovea portion of the retina in which visual acuity is greatest and subsequent morpheme comprehension most rapid.

6. The menu selection system of claim 1 wherein each of said nonrectangular areas have a pair of boundaries which converge at said origin.

7. The menu selection system of claim 6 wherein for each of said nonrectangular areas said pair of boundaries converge to define an angle of about the same size.

8. The menu selection system of claim 6 wherein each of said pairs of boundaries converge to define an angle, the size of said angle associated with certain predefined menu options being larger than those associated with other predefined menu options, whereby more frequently selected menu options present a more readily acquired area than less frequently selected menu options.

9. The menu selection system of claim 1 further comprising a central zone generally centered over said origin point.

10. The menu selection system of claim 9 wherein said central zone is contiguous with and defines a boundary of each of said nonrectangular areas.

11. The menu selection system of claim 9 wherein said central zone comprises a dead zone in which no options are selected by pointing device activation in the central zone.

12. The menu selection system of claim 9 wherein said central zone represents a predefined option such that pointing device activation in the central zone selects said predefined option.

13. The menu selection system of claim 12 wherein said plurality of option target areas comprises a first menu and wherein said predefined option effects selection of a second menu.

14. The menu selection system of claim 12 wherein said plurality of option target areas comprises a first menu and wherein said predefined option effects selection of a second menu hierarchically related to said first menu.

15. The menu selection system of claim 1 further comprising a keyboard having a plurality of keys, including a first key, a second key, a third key and a fourth key;

a means for designating a selected one of said option target areas as having focus, indicating that the selected option target area has been designated to be acquired;

said first and second keys being operative to move focus up and down, respectively, between vertically adjacent option target areas;

said third and fourth keys being operative to move focus left and right, respectively, between horizontally adjacent option target areas.

16. The menu selection system of claim 15 wherein said means for designating focus comprises a cursor.

17. The menu selection system of claim 15 wherein said means for designating focus comprises a cursor associated with said pointing device.

18. The menu selection system of claim 15 wherein said first and second keys are further operative to effect selection wrapping whereby up movement from the top-most option target area transfers focus to the bottom-most option target area.

19. The menus selection system of claim 15 wherein said first and second keys are further operative to effect selection wrapping whereby down movement from the bottom-most option target area transfers focus to the top-most option target area.

20. The menu selection system of claim 15 wherein said third and fourth keys are further operative to effect selection wrapping whereby left movement from a left-most option target area transfers focus to the adjacent right-most option target area.

21. The menu selection system of claim 15 wherein said third and fourth keys are further operative to effect selection wrapping whereby right movement from a right-most option target area transfers focus to the adjacent left-most option target area.

* * * * *